(12) United States Patent
Yousef Zadeh

(10) Patent No.: US 9,848,630 B2
(45) Date of Patent: Dec. 26, 2017

(54) PUFFED AND EXPANDED STARCH MATERIAL AND A METHOD OF SYNTHESIZING THE SAME

(71) Applicant: Saeid Yousef Zadeh, Gom (IR)

(72) Inventor: Saeid Yousef Zadeh, Gom (IR)

(*) Notice: Subject to any disclaimer, the term of this patent is extended or adjusted under 35 U.S.C. 154(b) by 0 days.

(21) Appl. No.: 15/284,135

(22) Filed: Oct. 3, 2016

(65) Prior Publication Data
US 2017/0020174 A1    Jan. 26, 2017

(51) Int. Cl.
*A23L 1/18* (2006.01)
*A23L 7/17* (2016.01)

(52) U.S. Cl.
CPC ............. *A23L 7/17* (2016.08); *A23V 2002/00* (2013.01)

(58) Field of Classification Search
CPC .............................. A23L 7/17; A23V 2002/00
See application file for complete search history.

(56) References Cited

U.S. PATENT DOCUMENTS

| | | | | |
|---|---|---|---|---|
| 3,476,567 A * | 11/1969 | Wood | ........................ | A23L 7/17 426/448 |
| 6,242,034 B1 * | 6/2001 | Bhaskar | ................... | A21C 3/04 426/448 |
| 6,953,165 B1 * | 10/2005 | Griebat | ..................... | B02B 5/02 241/11 |
| 2004/0089968 A1 * | 5/2004 | Bortone | ................. | A21C 11/16 264/167 |

\* cited by examiner

*Primary Examiner* — Katherine D Leblanc
(74) *Attorney, Agent, or Firm* — Barry Choobin; Patent 360

(57) ABSTRACT

The embodiments herein provide a puffed and extruded popcorn product synthesized from cornmeal. The popcorn product is similar in appearance, texture and flavor to that of a regular popcorn. A cornmeal is mixed with water to obtain a mixture. The cornmeal is cooked under high temperature and pressure. The cornmeal is passed to the die holes provided at the end of the extruder by the hammer type twin extrusion screws. The corn is extruded out of the holes at a high velocity to obtain a corn product of irregular shape. The corn product into several pieces of desired length by a cutter. The cut pieces are dried with a drier before packaging.

4 Claims, 5 Drawing Sheets

PUFFED AND EXPANDED STARCH MATERIAL AND A METHOD OF SYNTHESIZING THE SAME

BACKGROUND

Technical Field

The present invention generally relates to a production of puffed food products. The present invention particularly relates to a production of puffed products with irregular shapes. The present invention more particularly relates to a method for a production of popcorn from corn meal.

Description of the Related Art

Corn (*Zea mays*) is grown worldwide for its use as staple food and industrial applications. The maize plant is often 2.5 meter in height. The stem is commonly composed of 20 internodes (approximately) of 18 cm in length. The leaves grow from each node, and are of generally 9 cm in width and 120 cm in length. The elongated stigmas called silk emerge from the whorl of husk leaves at the end of the ear. The elongated stigmas have a pale yellow color and a length of 18 cm. The elongated stigmas appear like tufts of hair and at the end have a carpel. The carpel may develop into a "kernel" if fertilized by a pollen grain. The pericarp of the fruit is fused with the seed coat referred to as "caryopsis" that is typical of the grasses and the entire kernel is often referred to as "seed". The cob is close to a multiple fruit in structure, except that the individual fruits (kernels) never fuse into a single mass. The grains/kernels are of the size of peas and adhered in regular rows around a white pithy structure which forms the ear. The maximum size of maize kernel is reported to be 2.5 cm. An ear commonly holds 600 maize kernels. The maize kernels are of various colors, such as blackish, bluish gray, purple, red, white and yellow. When the maize kernels are grinded into flour, the flour yield is more with much less bran when compared to wheat flour. The maize kernel flour lacks the protein gluten of wheat and therefore makes baked goods with poor rising capability. The genetic variant that accumulates more sugar and less starch in the ear is consumed as a vegetable and is called sweet corn. Young ears can be consumed raw, with the cob and silk, but as the plant matures (usually during the summer months) the cob becomes tougher and the silk dries to inedibility. By the end of the growing season, the maize kernels dry out and become difficult to chew without cooking them tender first in boiling water.

The leafy stalk produces ears which contain the grain, the grains are seeds called kernels. Maize kernels are often used in cooking as a source of starch (carbohydrate). The major cultivated corn types are flour corn (*Zea mays* var. *anylacea*), popcorn (*Zea mays* var. *everta*), Dent corn (*Zea mays* var. *indentata*), Flint corn (*Zea mays* var. *indurata*), Sweet corn (*Zea mays* var. *saccharata*), Waxy corn (*Zea mays* var. *ceratina*), Amylo-maize (*Zea mays*), Pool corn (*Zea mays* var. *Tunicata Larranga*) and Striped maize (*Zea mays* var. *Japonica*).

The corn (*Zea mays*) is used as human food (in the form of tacos, tortillas, polenta, bread, snack food, corn flakes), corn starch, cooking oil (corn oil), fructose corn syrup, sweetener, maize grain alcohol and for feeding livestock.

The oldest and the most popular puffed snack product is popcorn which is prepared by heating kernels of popping corn until they explode. The cost and nutritional value of natural corn used for making popcorn are directly determined by the price and quantity of the popping corn. The quality of the corn used also determines the size and textures of the expanded corn pieces and the percentages of the kernels which are successfully converted into expanded product pieces (popcorns). It is therefore difficult to produce a natural popcorn of uniformly high quality and there is no opportunity to reduce its cost. The nutritional value of natural popcorn is not readily altered except by additives (flavoring agent, fats, salt etc) which increase cost.

Snacks and cured products have been commonly puffed or expanded in the past by any of one of the methods including extrusion, fat frying, salt puffing and hot air puffing. In the well known methods for extruding a snack or ready to eat cereal, flour, such as wheat flour or rice flour is mixed with water to form a dough which is subjected to a screw type extruder. The screw mechanism applies a substantial amount of force to the dough, and increases the temperature of the dough to a point at or above 212° F. The dough is then extruded, water is flashed off and the flour based product is expanded. Another conventional method for preparing a puffed snack includes mixing flour material of corn, wheat, oats, barley, rye or other cereal with water and cooking the dough in a steam jacketed cooker. The cooked dough is extruded under low pressure so that there is little or no puffing during extrusion. The extrudate is cut into pieces and then expanded in a process such as by deep fat frying.

The conventional method of producing popcorn leads to the yield of popcorn which are gritty and lead to toothpacking. It is also recognized that the quality of popcorn is subject to considerable variation. Thus some types of popcorn produce relatively small kernels of popcorn, while others produce much larger kernels. Moreover the number of kernels of popcorn also varies quite substantially for the reason that different grades of popcorn pop to a greater or less extent. With some types of popcorn, the number of unpopped kernels constitutes a substantial proportion of the corn supplied to the popping apparatus. Some control over the popping qualities of popcorn can be obtained by adjusting their moisture content and the like, but nevertheless it is difficult to obtain a product of uniformly high quality even in large commercial operations.

Prior arts disclose a process of producing a simulated popcorn product of uniform high quality from cornmeal. In the process, white or yellow cornmeal (or a mixture) with a moisture content of 10 and 12.3% is forced at a high velocity of 950-1800 inches per minute, by means of high pressure through extrusion orifices. The cornmeal is discharged from the orifices in rods which resemble branches with numerous irregularly shaped buds extending from their sides in generally equally spaced clusters. By cutting these rods into small pieces as the rods are extruded, simulated popcorn pieces are formed.

While the prior art process provides a means of producing corn product pieces which are more uniform in size and quality, it does not provide a way to materially improve the nutritional value of the product. With the natural popcorn, the protein, vitamin and mineral content of the final product is that of the raw corn used. Also the potential cost reduction is limited by the fact that cornmeal having a moisture content within the narrow range of 10 to 12.3% must be selected for use in the process. This critical moisture range limits the sources of supply to those of known moisture content (which would tend to be higher in price) or requires that the purchased cornmeal be tested to determine the moisture content. While cornmeal having a lesser moisture content is also used with the addition of water, it is necessary to determine the moisture content of each batch of cornmeal before use, thus increasing costs.

There are drawbacks with the conventional methods of popping corn. To pop "popcorn" the kernels must be heated so that internal heat buildup cause the kernel to explode. Once the kernel has exploded, it is desirable for the cooking process to stop.

One conventional method of popping corn is to heat the kernel on a hot surface. There are drawbacks in this method. First, the heating surface affects a small volume of the kernels. The spot on the kernel that contacts the hot surface. Second the "husk" (outer surface) of the kernel tends to burn on the spot that contacts the hot surface. Once the kernel has popped, the popped kernel including the attached husk, continues to burn on the spot that contacts the hot surface because the popped kernels are not separated from the un-popped kernels. The burnt spots give the popcorn an undesirable burn taste.

To help alleviate this problem, one may share or constantly stir the popped and un-popped kernels. Additionally, the heated surface temperature may be reduced. Finally, the cooking process can be stopped before all the kernels are popped. The result is that there still is a burn taste. The process is slow and not all the kernels are popped leaving waste kernels mixed in with the popped kernels.

Another conventional method to cook the kernels is to use hot oil. This tends to speed up the heat transfer to the kernel and provide a more uniform application of heat to the kernel. While this process addresses spot burning, cooking with oil has its disadvantages. Hot oil can still burn the popcorn if the oil is too hot or if the kernel takes too long to pop. Further it leaves an undesirable residue on the popcorn that carries the burn taste from burnt kernels to the popped corn. Finally the popped kernels continue to cook after popping.

A third method of popping corn is by the use of an oven. Conventional ovens, however cannot transfer heat to the inside of the kernel fast enough to be speed efficient. And the problems of over cooking the popped corn and the presence of wasted un-popped kernels are still present.

Microwave popping corn addresses the most pre-dominant problem of popping corn speed. But still the problems of spot burning, over cooking of the husk and popped corn and left over un-popped kernels are still present. Additionally microwave popping of corn is hard to do in mass quantities.

Hot air popping machines which cook the kernels with swirling hot air, addresses the spot burning problem. The popped corn however still swirls in hot air after popping so over cooking is still a problem. Further the speed is never sufficient.

Hence, there is a need for a method/process for producing popcorn without any spot burning of popcorn, preventing a continuation of cooking even after a completion of popping of corn, without any residue on the popped corn and preventing any leftover of un-popped maize kernels. Also there is a need for a method for producing popcorn from cornmeal instead of maize/corn kernel.

The above mentioned shortcomings, disadvantages and problems are addressed herein and which will be understood by reading and studying the following specification.

OBJECTIVES OF THE EMBODIMENTS

The primary objective of the embodiment herein is to produce popcorn using cornmeal.

Another objective of the embodiment herein is to provide a method for producing popcorn from cornmeal by pressing out the crushed cornmeal out under high pressure and high temperature to discharge through the circular holes of the extruder to obtain popcorn.

Yet another objective of the embodiment herein is to remove the shells from hard kernels of corn and convert the de-shelled corn kernels into cornmeal.

Yet another objective of the embodiment herein is to produce crisp and dry popcorn from cornmeal.

Yet another objective of the embodiment herein is to provide an economical and easy method for producing popcorn from cornmeal.

Yet another objective of the embodiment herein is to provide method for producing cornmeal and subsequently popcorn from corn/maize kernels.

Yet another objective of the embodiment herein is to provide the popcorns produced from cornmeal with a pleasant smell for easy consumption by a consumer.

Yet another objective of the embodiment herein is to provide popcorn from cornmeal with puffed shape and extrusions.

Yet another objective of the embodiment herein is to synthesize popcorn from cornmeal using an apparatus (extruder) with die holes of smaller diameter and cutter.

These and other objects and advantages of the present invention will become readily apparent from the following detailed description taken in conjunction with the accompanying drawings.

SUMMARY

The various embodiments herein provide a cheaper and convenient method for producing popcorn from cornmeal. The popcorns produced from cornmeal are easily consumed and have a pleasant smell/odor for consumer.

According to one embodiment herein, a method is provided for synthesizing puffed and expanded popcorn product from cornmeal. The method comprises the following steps. The corn kernels/corn seeds are pre-treated. The pre-treated corn kernels/corn seeds are grinded. A cornmeal is obtained and the cornmeal comprises corn particles with a plurality of particle sizes. The cornmeal is added to an extruder cylinder/barrel through a feeder. Water is added into the extruder cylinder/barrel through the feeder to obtain a cornmeal paste. The cornmeal paste is grinded and mixed in the extruder cylinder/barrel by a twin screw mechanism. The cornmeal paste is cooked under a preset temperature and preset pressure conditions to obtain a cooked cornmeal. The preset temperature and preset pressure are produced and maintained by a twin screw mechanism. The twin screw is a hammer type twin extrusion screw. The temperature is controlled and regulated in the extruder cylinder/barrel. The cooked cornmeal is transferred to the end of the extruder by a spiral motion of the twin screw. The cooked cornmeal is extruded out of the extruder cylinder/barrel under preset pressure from a plurality of die holes. The cooked cornmeal is extruded out of the plurality of die holes to achieve an irregular shape. The cooked cornmeal after extrusion has same surface, porosity, texture, taste and shape of popcorn. The cooked cornmeal with irregular shape is cut into pieces after extrusion from the plurality of die holes to obtain the popcorn product. The cut cornmeal/popcorn product is cooled and dried on a vibrating separation system or a sieve.

According to one embodiment herein, the step of pre-treating corn kernel or corn seeds comprises removing external shells of corn kernels or corn seeds and removing of hard corn kernels or corn seeds.

According to one embodiment herein, the cornmeal comprises corn particles of a plurality of sizes. The corn particles with a particle size greater than 1000µ are present in a concentration of 5% w/w. The corn particles with a particle size of 500-1000μ are present in a concentration of 45-50% w/w. The corn particles with a particle size of 250-500μ are present in a concentration of 25-30% w/w. The corn particles with a particle size smaller than 250μ are present in a concentration of 25% w/w.

According to one embodiment herein, the preset pressure in the extruder cylinder/barrel is 135 bars. The pressure is produced by a circular motion of the twin screws. The circular motion of the twin screw and the pressure produced by the twin screw motion pushes the cornmeal further towards a plurality of die holes.

According to one embodiment herein, the preset temperature in the extruder cylinder/barrel is 180° C. A temperature at an end portion of the extruder is maintained in a range of 55-60° C. A temperature of extruder in an area before die holes is maintained in a range of 40-45° C. The end portion of the extruders covers an area of 50 cm. The area before die holes covers an area of 25 cm.

According to one embodiment herein, the temperature in the extruder cylinder/barrel is controlled to avoid burning of the cooked cornmeal.

According to one embodiment herein, the temperature is controlled in the extruder cylinder/barrel by circulating hot water outside the extruder cylinder/barrel. The hot water produces the temperature which cooks the cornmeal in the extruder barrel/cylinder. The hot water cooks the cornmeal inside the extruder cylinder/barrel.

According to one embodiment herein, a system is provided for synthesizing puffed and expanded popcorn product from cornmeal. The system comprises a feeder for adding cornmeal and water, and the cornmeal comprises corn particles with a plurality of particle sizes. A cylindrical barrel is connected to the feeder for receiving the cornmeal and the water. The cornmeal and the water are added to the cylindrical barrel to form a cornmeal paste. A twin screw mechanism is provided inside the cylindrical barrel, and the twin screw mechanism is configured for grinding and mixing the cornmeal paste in the cylindrical barrel. The twin screw mechanism is a hammer type twin screw mechanism. The twin screw mechanism is configured to provide a preset temperature and preset pressure for cooking the cornmeal paste to obtain a cooked cornmeal. A plurality of die holes is provided at an end of the cylindrical barrel to extrude a cooked cornmeal under high pressure to yield a corn product of irregular shape. A cutter is provided at the end of the plurality of die holes to cut the extruded cornmeal product into a plurality of pieces of desired length. A dryer is provided for drying the plurality of pieces before packaging. The temperature is controlled and regulated in the cylinder/barrel. The twin screw mechanism is configured to transfer the cooked cornmeal to the end of the cylindrical barrel. The cooked cornmeal after extrusion has same surface, porosity, texture, taste and shape of a regular popcorn.

According to one embodiment herein, a new food product is made by the heating, extruding and expanding cornmeal under suitable conditions. The porosity, texture, taste and appearance of the product are similar to a popcorn.

According to one embodiment herein, the cornmeal is produced from the corn kernels. The cornmeal is subjected to high pressure and high temperature. After subjecting the cornmeal to high temperature and high pressure, a product which is similar in shape and taste to that of a popcorn is obtained. The product comes out of the extruder machine in the form of popcorn.

According to one embodiment herein, the popcorn is produced under high temperature and pressure. The high temperature and high pressure give rise to an explosion of the cornmeal particles leading to the formation of popcorn. The mechanism behind the explosion of the cornmeal particles is as follows. When the humidity escapes from the cornmeal particles/corn seeds (kernels), then puffed shape and extrusions occur in the product.

According to one embodiment herein, the corn is preprocessed before subjecting to the popcorn synthesis process. The corn seeds are pretreated for the removal of the external shells. Further the hard seeds from the batch of corn seeds are removed. The corn seeds without external shell are subjected to grinding to obtain a cornmeal. The cornmeal is used as raw material to make the puffed and extruded popcorn.

According to one embodiment herein, the cornmeal comprises particles of various sizes. The corn particles with a size of more than 1000μ are present in a concentration of 5% w/w. The corn particles with a size of 500-1000μ are present in a concentration of 45-50% w/w. The corn particles with a size of 250-500μ are present in a concentration of 25-30% w/w. The corn particles with a size of smaller than 250μ are present in a concentration of 25% w/w.

According to one embodiment herein, the cornmeal is passed to the extruder according to the grading (size). At the beginning of the extruder, water is added to the cornmeal in the cylindrical barrel of the extruder. Within a few centimeters of the passage of the mixture of corn meal and water in the extruder, a corn paste is obtained. The extruder has spiral parts/mechanisms that are arranged in the cylinder in a manner to apply high pressure to the corn paste. The spiral parts of the extruder is configured to crush the corn paste and increase uniform mixing of the cornmeal and water. An optimum pressure and temperature is maintained in the extruder for converting the cornmeal paste into puffed and extruded popcorn particles.

According to one embodiment herein, the extruder comprises an input unit or feeder, cylindrical barrel, vibrator, sieve, temperature unit, pressure unit, screws, spiral parts, pores (die holes), dryer unit and a cutter system.

The input unit or feeder is configured for addition of the cornmeal and water. The sieve is employed to remove any corn seed present in the cornmeal which is not grinded. The vibrator is operated to move forward the mixture of the cornmeal and water. The spiral parts/mechanism are arranged in a preset/particular manner in the extruder to apply pressure to the cornmeal. The spiral part is configured to crush the cornmeal and provide a uniform mixing of the water and cornmeal. The temperature unit and the pressure unit are built in the extruder. The high temperature is also achieved and maintained by the spiral movement of the twin screws which are configured to grind and mix the cornmeal paste. The temperature unit is configured to provide the temperature required for cooking the cornmeal mixture with water. The cooked cornmeal is exploded to form the puffed popcorn during extrusion under the high temperature and pressure. The screws are provided in the extruder for changing the speed of the movement of the materials. The screws are rotated to move the cornmeal in a forward direction with the applied pressure. The pressure is applied as a result of adding more corn to the extruder. Heat is produced due to the speed of the screws and spiral parts constantly hitting the extruder walls, to crush the cornmeal further. After the cornmeal is subjected to the high temperature and pressure, the cornmeal is cooked and cooked cornmeal is passed to the exit of the extruder. The exit of the extruder is provided with die holes and cutter machine.

According to one embodiment herein, the cornmeal is poured into the extruder from the feeder. The cornmeal is mixed with water in the first portion of the extruder barrel or cylinder to form a cornmeal paste. The cornmeal paste is subjected to heat treatment. The heat is produced by the twin screw mechanism and the hot water circulated around the cylindrical barrel. The cornmeal is cooked at the high temperature. The cornmeal is moved forward in the extruder due to with the movement of the spiral parts and the vibrator in the extruder. At the end of the extruder, the cooked cornmeal is passes through the die holes. A cutter machine is installed in front of the die holes to cut the product into a plurality of pieces with a desired length.

According to one embodiment herein, the speed of the rotation of the screws is changed the speed. The movement of the screws enables a forward movement of the material (cornmeal paste) with the pressure applied as a result of adding more corn to the extruder. Thus, the machine parts are configured to constantly hit and heat the crush at this reduced speed. The pressure and temperature beyond normal levels in the extruder is considered as a high temperature and pressure. The cylinder walls are considerably cooled by circulating water around the cylindrical barrel to avoid a burning of the cooked cornmeal. The holes designed with smaller area than that of the snacks (popcorn/cornmeal) are provided at the end of the spiral parts to extrude the cooked cornmeal thereby simulating a condition exact to that of explosion popcorn. This allows for the crushed cornmeal to lose its circular shape under high pressure and temperature. The cornmeal paste is then turned into popcorn-shape.

According to an embodiment herein, the cornmeal is slowly moved on a tape/belt to become cool to make the cooked cornmeal mixture into a crisp and dry product. In order to have a crisp product, the cooked cornmeal is dried in another machine before the packaging process. A drying of the cooked cornmeal is very delicate since the cooked cornmeal is highly breakable and porous. The pores are separated at the end of the drying process by a vibrating separation system or a sieve.

According to one embodiment herein, the normal type screws are replaced by the hammer type twin screws in the cylindrical barrel at the extruder. The hammer type twin screws are configured to increase the popcorn production from the cornmeal by uniform mixing of the cornmeal with water and crushing the cornmeal.

According to one embodiment herein, the basic principle for the explosion of popcorn seeds is by subjecting the popcorn kernels or seeds to heat and pressure. The moisture contents/water content in the popcorn kernels or seeds comes out after explosion. The explosion takes place as a result of the high temperature and pressure. The similar principle is applicable to the popcorn produced from the cornmeal mixed with water. When the cornmeal mixture is cooked by subjecting the cornmeal to high temperature and pressure conditions, the cooked cornmeal is converted into puffed and extruded popcorn. The cooked cornmeal is shot out of the die holes with plurality of extrusions. The cornmeal that shoots out of the die holes is exploded, puffed and extruded like popcorn. The die holes are different from the normal die holes, as the ends of the die holes are narrowed in the present invention. The narrow shape of the die holes is configured to generate the erratic shape of the puffed and extruded cornmeal into popcorn shape.

According to one embodiment herein, the pressure at the end of the extruder barrel is kept and maintained at 135 bars. The temperature in the extruder barrel is maintained at 180° C. The temperature in the last 50 cm of the extruder cylinder is kept and maintained at 55-60° C. The temperature in the last 25 cm of the extruder cylinder (before die holes) is kept and maintained at 40-45° C. The temperature in the extruder cylinder is regulated in such a manner to avoid a burning of the cooked cornmeal. The temperature of the extruder cylinder is maintained and regulated by circulating water outside the extruder. The water is circulated to absorb excess heat to avoid the burning of the puffed and extruded popcorn. The hot water generated by absorbing the heat is circulated outside the extruder cylinder.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
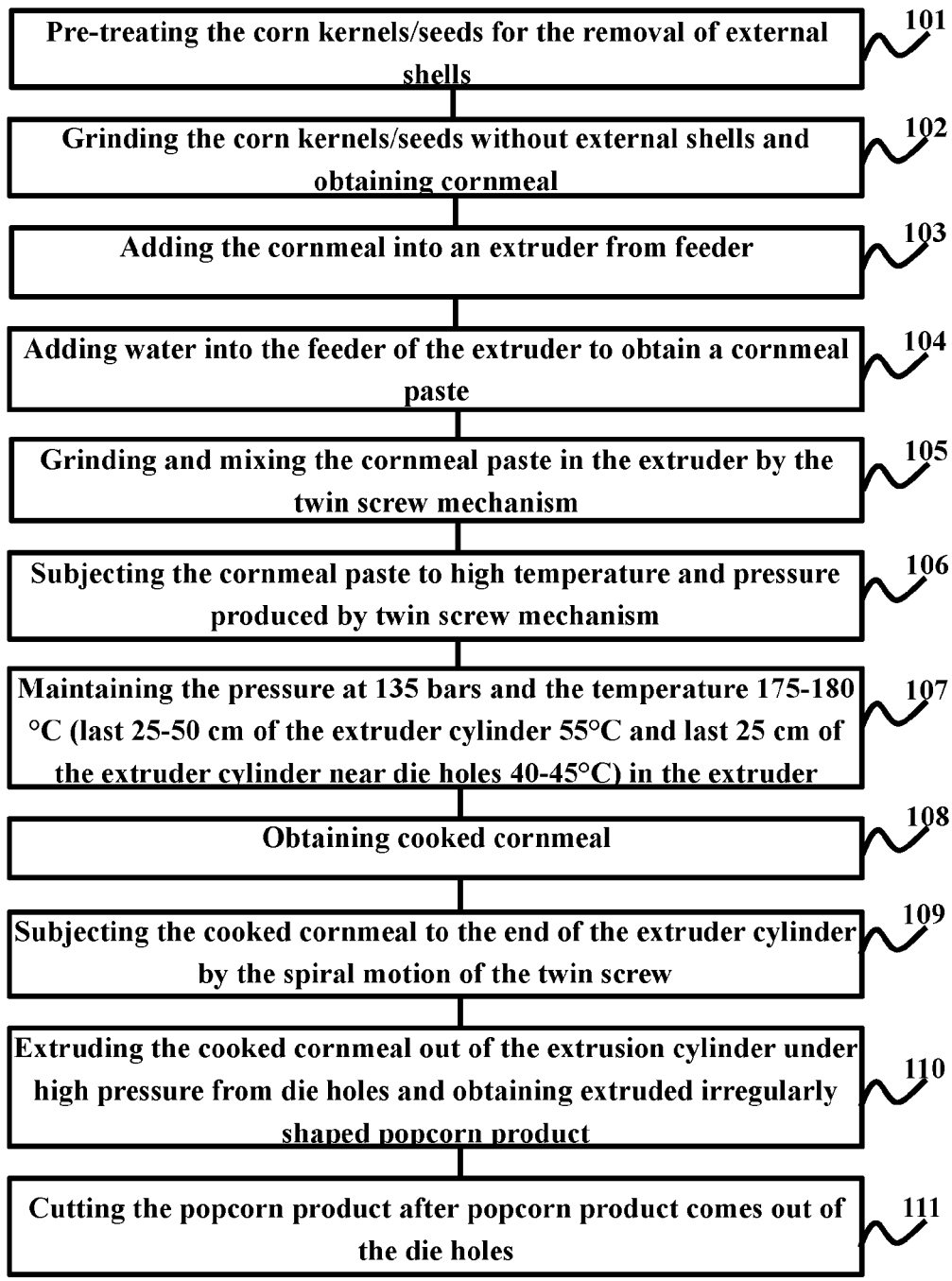
FIG. 1 illustrates a flow chart explaining a method of synthesizing, puffing and extrusion of popcorn from cornmeal, according to one embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a cheaper and convenient method for producing popcorn from cornmeal. The popcorns produced from cornmeal are easily consumed and have a pleasant smell/odor for consumer.

According to one embodiment herein, a method is provided for synthesizing puffed and expanded popcorn product from cornmeal. The method comprises the following steps. The corn kernels/corn seeds are pre-treated. The pre-treated corn kernels/corn seeds are grinded. A cornmeal is obtained and the cornmeal comprises corn particles with a plurality of particle sizes. The cornmeal is added to an extruder cylinder/barrel through a feeder. Water is added into the extruder cylinder/barrel through the feeder to obtain a cornmeal paste. The cornmeal paste is grinded and mixed in the extruder cylinder/barrel by a twin screw mechanism. The cornmeal paste is cooked under a preset temperature and preset pressure conditions to obtain a cooked cornmeal. The preset temperature and preset pressure are produced and maintained by a twin screw mechanism. The twin screw is a hammer type twin extrusion screw. The temperature is controlled and regulated in the extruder cylinder/barrel. The cooked cornmeal is transferred to the end of the extruder by a spiral motion of the twin screw. The cooked cornmeal is extruded out of the extruder cylinder/barrel under preset pressure from a plurality of die holes. The cooked cornmeal is extruded out of the plurality of die holes to achieve an irregular shape. The cooked cornmeal after extrusion has same surface, porosity, texture, taste and shape of popcorn. The cooked cornmeal with irregular shape is cut into pieces after extrusion from the plurality of die holes to obtain the popcorn product. The cut cornmeal/popcorn product is cooled and dried on a vibrating separation system or a sieve.

According to one embodiment herein, the step of pre-treating corn kernel or corn seeds comprises removing external shells of corn kernels or corn seeds; and removing of hard corn kernels or corn seeds.

According to one embodiment herein, the cornmeal comprises corn particles of a plurality of sizes. The corn particles with a particle size greater than 1000μ are present in a concentration of 5% w/w. The corn particles with a particle size of 500-1000μ are present in a concentration of 45-50% w/w. The corn particles with a particle size of 250-500μ are present in a concentration of 25-30% w/w. The corn particles with a particle size smaller than 250μ are present in a concentration of 25% w/w.

According to one embodiment herein, the preset pressure in the extruder cylinder/barrel is 135 bars. The pressure is produced by a circular motion of the twin screws. The circular motion of the twin screw and the pressure produced by the twin screw motion pushes the cornmeal further towards a plurality of die holes.

According to one embodiment herein, the preset temperature in the extruder cylinder/barrel is 180° C. A temperature at an end portion of the extruder is maintained in a range of 55-60° C. A temperature of extruder in an area before die holes is maintained in a range of 40-45° C. The end portion of the extruders covers an area of 50 cm. The area before die holes covers an area of 25 cm.

According to one embodiment herein, the temperature in the extruder cylinder/barrel is controlled to avoid burning of the cooked cornmeal.

According to one embodiment herein, the temperature is controlled in the extruder cylinder/barrel by circulating hot water outside the extruder cylinder/barrel. The hot water produces the temperature which cooks the cornmeal in the extruder barrel/cylinder. The hot water cooks the cornmeal inside the extruder cylinder/barrel.

According to one embodiment herein, a system is provided for synthesizing puffed and expanded popcorn product from cornmeal. The system comprises a feeder for adding cornmeal and water, and the cornmeal comprises corn particles with a plurality of particle sizes. A cylindrical barrel is connected to the feeder for receiving the cornmeal and the water. The cornmeal and the water are added to the cylindrical barrel to form a cornmeal paste. A twin screw mechanism is provided inside the cylindrical barrel, and the twin screw mechanism is configured for grinding and mixing the cornmeal paste in the cylindrical barrel. The twin screw mechanism is a hammer type twin screw mechanism. The twin screw mechanism is configured to provide a preset temperature and preset pressure for cooking the cornmeal paste to obtain a cooked cornmeal. A plurality of die holes is provided at an end of the cylindrical barrel to extrude a cooked cornmeal under high pressure to yield a corn product of irregular shape. A cutter is provided at the end of the plurality of die holes to cut the extruded cornmeal product into a plurality of pieces of desired length. A dryer is provided for drying the plurality of pieces before packaging. The temperature is controlled and regulated in the cylinder/barrel. The twin screw mechanism is configured to transfer the cooked cornmeal to the end of the cylindrical barrel. The cooked cornmeal after extrusion has same surface, porosity, texture, taste and shape of a regular popcorn.

According to one embodiment herein, a new food product is made by the heating, extruding and expanding cornmeal under suitable conditions. The porosity, texture, taste and appearance of the product are similar to a popcorn.

According to one embodiment herein, the cornmeal is produced from the corn kernels. The cornmeal is subjected to high pressure and high temperature. After subjecting the cornmeal to high temperature and high pressure, a product which is similar in shape and taste to that of a popcorn is obtained. The product comes out of the extruder machine in the form of popcorn.

According to one embodiment herein, the popcorn is produced under high temperature and pressure. The high temperature and high pressure give rise to an explosion of the cornmeal particles leading to the formation of popcorn. The mechanism behind the explosion of the cornmeal particles is as follows. When the humidity escapes from the cornmeal particles/corn seeds (kernels), then puffed shape and extrusions occur in the product.

According to one embodiment herein, the corn is pre-processed before subjecting to the popcorn synthesis process. The corn seeds are pretreated for the removal of the external shells. Further the hard seeds from the batch of corn seeds are removed. The corn seeds without external shell are subjected to grinding to obtain a cornmeal. The cornmeal is used as raw material to make the puffed and extruded popcorn.

According to one embodiment herein, the cornmeal comprises particles of various sizes. The corn particles with a size of more than 1000μ are present in a concentration of 5% w/w. The corn particles with a size of 500-1000μ are present in a concentration of 45-50% w/w. The corn particles with a size of 250-500μ are present in a concentration of 25-30% w/w. The corn particles with a size of smaller than 250μ are present in a concentration of 25% w/w.

According to one embodiment herein, the cornmeal is passed to the extruder according to the grading (size). At the beginning of the extruder, water is added to the cornmeal in the cylindrical barrel of the extruder. Within a few centimeters of the passage of the mixture of corn meal and water in the extruder, a corn paste is obtained. The extruder has spiral parts/mechanisms that are arranged in the cylinder in a manner to apply high pressure to the corn paste. The spiral parts of the extruder is configured to crush the corn paste and increase uniform mixing of the cornmeal and water. An optimum pressure and temperature is maintained in the extruder for converting the cornmeal paste into puffed and extruded popcorn particles.

According to one embodiment herein, the extruder comprises an input unit or feeder, cylindrical barrel, vibrator, sieve, temperature unit, pressure unit, screws, spiral parts, pores (die holes), dryer unit and a cutter system.

The input unit or feeder is configured for addition of the cornmeal and water. The sieve is employed to remove any corn seed present in the cornmeal which is not grinded. The vibrator is operated to move forward the mixture of the cornmeal and water. The spiral parts/mechanism are arranged in a preset/particular manner in the extruder to apply pressure to the cornmeal. The spiral part is configured to crush the cornmeal and provide a uniform mixing of the water and cornmeal. The temperature unit and the pressure unit are built in the extruder. The high temperature is also achieved and maintained by the spiral movement of the twin screws which are configured to grind and mix the cornmeal paste. The temperature unit is configured to provide the temperature required for cooking the cornmeal mixture with water. The cooked cornmeal is exploded to form the puffed popcorn during extrusion under the high temperature and pressure. The screws are provided in the extruder for changing the speed of the movement of the materials. The screws are rotated to move the cornmeal in a forward direction with the applied pressure. The pressure is applied as a result of adding more corn to the extruder. Heat is produced due to the speed of the screws and spiral parts constantly hitting the extruder walls, to crush the cornmeal further. After the cornmeal is subjected to the high temperature and pressure, the cornmeal is cooked and cooked cornmeal is passed to the exit of the extruder. The exit of the extruder is provided with die holes and cutter machine.

According to one embodiment herein, the cornmeal is poured into the extruder from the feeder. The cornmeal is mixed with water in the first portion of the extruder barrel or cylinder to form a cornmeal paste. The cornmeal paste is subjected to heat treatment. The heat is produced by the twin screw mechanism and the hot water circulated around the cylindrical barrel. The cornmeal is cooked at the high temperature. The cornmeal is moved forward in the extruder due to with the movement of the spiral parts and the vibrator in the extruder. At the end of the extruder, the cooked cornmeal is passes through the die holes. A cutter machine is installed in front of the die holes to cut the product into a plurality of pieces with a desired length.

According to one embodiment herein, the speed of the rotation of the screws is changed the speed. The movement of the screws enables a forward movement of the material (cornmeal paste) with the pressure applied as a result of adding more corn to the extruder. Thus, the machine parts are configured to constantly hit and heat the crush at this reduced speed. The pressure and temperature beyond normal levels in the extruder is considered as a high temperature and pressure. The cylinder walls are considerably cooled by circulating water around the cylindrical barrel to avoid a burning of the cooked cornmeal. The holes designed with smaller area than that of the snacks (popcorn/cornmeal) are provided at the end of the spiral parts to extrude the cooked cornmeal thereby simulating a condition exact to that of explosion popcorn. This allows for the crushed cornmeal to lose its circular shape under high pressure and temperature. The cornmeal paste is then turned into popcorn-shape.

According to an embodiment herein, the cornmeal is slowly moved on a tape/belt to become cool to make the cooked cornmeal mixture into a crisp and dry product. In order to have a crisp product, the cooked cornmeal is dried in another machine before the packaging process. A drying of the cooked cornmeal is very delicate since the cooked cornmeal is highly breakable and porous. The pores are separated at the end of the drying process by a vibrating separation system or a sieve.

According to one embodiment herein, the normal type screws are replaced by the hammer type twin screws in the cylindrical barrel at the extruder. The hammer type twin screws are configured to increase the popcorn production from the cornmeal by uniform mixing of the cornmeal with water and crushing the cornmeal.

According to one embodiment herein, the basic principle for the explosion of popcorn seeds is by subjecting the popcorn kernels or seeds to heat and pressure. The moisture contents/water content in the popcorn kernels or seeds comes out after explosion. The explosion takes place as a result of the high temperature and pressure. The similar principle is applicable to the popcorn produced from the cornmeal mixed with water. When the cornmeal mixture is cooked by subjecting the cornmeal to high temperature and pressure conditions, the cooked cornmeal is converted into puffed and extruded popcorn. The cooked cornmeal is shot out of the die holes with plurality of extrusions. The cornmeal that shoots out of the die holes is exploded, puffed and extruded like popcorn. The die holes are different from the normal die holes, as the ends of the die holes are narrowed in the present invention. The narrow shape of the die holes is configured to generate the erratic shape of the puffed and extruded cornmeal into popcorn shape.

According to one embodiment herein, the pressure at the end of the extruder barrel is kept and maintained at 135 bars. The temperature in the extruder barrel is maintained at 180° C. The temperature in the last 50 cm area of the extruder cylinder is kept and maintained at 55-60° C. The temperature in the last 25 cm area of the extruder cylinder (before die holes) is kept and maintained at 40-45° C. The temperature in the extruder cylinder is regulated in such a manner to avoid a burning of the cooked cornmeal. The temperature of the extruder cylinder is maintained and regulated by circulating water outside the extruder. The water is circulated to absorb excess heat to avoid the burning of the puffed and extruded popcorn. The hot water generated by absorbing the heat is circulated outside the extruder cylinder.

FIG. 1 illustrates a flow chart explaining a method of synthesizing, puffing and extrusion of popcorn from cornmeal, according to one embodiment herein. With respect to FIG. 1, the method comprises pre-treating the corn kernels/seeds for the removal of external shells (101). The corn kernels/seeds without external shells are grinded and cornmeal is obtained (102). The cornmeal is fed into an extruder through a feeder (103). Water is added into the feeder of the extruder to obtain a cornmeal paste (104). The cornmeal paste is grinded and mixed by the twin screw mechanism in the extruder (105). The cornmeal paste is subjected to high temperature and pressure. The high temperature and pressure conditions are produced by twin screw mechanisms (106). The pressure is maintained at 135 bars and the temperature is maintained at 175-180° C. The temperature in the last 50 cm area of the cylinder in the extruder is kept and maintained at 55-60° C. The temperature in the last 25 cm area (before die holes) of the cylinder in the extruder is kept and maintained at 40-45° C. The temperature in the extruder cylinder is regulated in such a manner to avoid a burning of the cooked cornmeal (107). The cooked cornmeal is obtained (108). The cooked cornmeal is passed to the end of the cylinder in the extruder by the spiral motion of the twin screw (109). The cooked cornmeal is extruded out of the extrusion cylinder under high pressure from die holes and obtaining extruded irregular shaped popcorn product (110). The popcorn product is cut after popcorn product comes out of the die holes (111).

Figure 2:
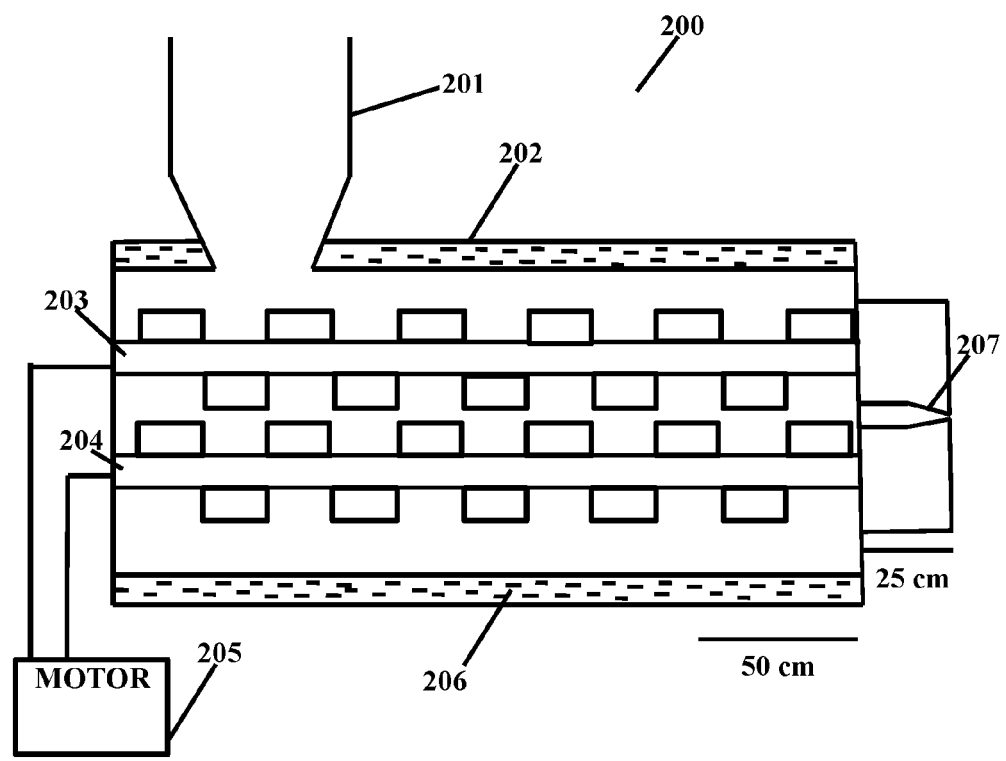
FIG. 2 illustrates side sectional view of the extruder used for synthesis of puffed popcorn product from cornmeal, according to one embodiment herein.

FIG. 2 illustrates side sectional view of the extruder used for synthesis of puffed popcorn product from cornmeal, according to one embodiment herein. With respect to FIG. 2, the extruder 200 for the synthesis of popcorn product from cornmeal comprises feeder 201, barrel/cylinder 202, twin crews 203 and 204, motor 205, hot water 206 and a plurality of die holes 207. The cornmeal and the water are added into the barrel/cylinder 202 in the extruder through the feeder 201. The barrel/cylinder is made of stainless steel or alloys thereof. The twin screws 203 and 204 are present in the barrel/cylinder 202 in the extruder for grinding and mixing the cornmeal and water. The twin screws 203 and 204 are made up of stainless steel or alloys thereof. The twin screws 203 and 204 are operated by a motor 205. The motor 205 provides the electrical energy to rotate the twin screws 203 and 204. The twin screws 203 and 204 are hammer type screws. The twin screws 203 and 204 are rotated to grind and mix the cornmeal with water to obtain a cornmeal paste. The circular movement of the twin screws is used to moves the cornmeal paste forward towards the die holes 207. A corn paste is produced within a few centimeters of the barrel/cylinder 202 in the extruder. The spiral parts (twin screws 203 and 204) of the extruder are arranged for applying a high pressure to the cornmeal for crushing the cornmeal and mixing the cornmeal with water uniformly. Also the twin screws 203 and 204 are configured to produce pressure and temperature. The circular movement of the twin screws 203 and 204 helps in the forward movement of the cornmeal paste by the pressure applied due to an addition of the cornmeal. The twin screws 203 and 204 are rotated to constantly move and heat the crushed cornmeal. The cornmeal is crushed under high pressure produced and the twin screws 203 and 204. The pressure in the barrel/cylinder 202 of the extruder is maintained at 135 bars. The hot water 206 is circulated around the barrel/cylinder 202 in the extruder to maintain a temperature of 175° C. for cooking the cornmeal paste. The temperature is maintained at 55° C. in the last 50 cm area of the barrel/cylinder 202 in the extruder. The temperature is maintained at 40-45° C. in the last 25 cm area of the barrel/cylinder 202 near the die holes 207 in the extruder. The temperature is the last 50 cm and last 25 cm areas of the barrel/cylinder in the extruder is varied to avoid the burning of the cooked cornmeal. The cooked cornmeal is extruded out of the barrel/cylinder 202 in the extruder from the die holes 207. The cooked cornmeal after the high temperature and pressure treatment is shot out from the die holes 207 same as popcorn. The diameter at the end of the die holes 207 is narrowed down. The narrow end of the die holes 207 causes the erratic shape of the cooked cornmeal paste. The shape of the cooked cornmeal paste extruded out of the die hole is of several shapes. The shape of the extruded cornmeal is same as that of the normal popcorn because of the pressurized exit from the small dimensions of the die holes. The cooked cornmeal is expelled out is with a high pressure from the end of the barrel/cylinder in the extruder. The size of the die holes 207 is smaller than that of the cooked cornmeal. The smaller dimension/size of the die holes than that of the cooked cornmeal leads to the explosion and extrusion into a shape that is similar to that of a regular popcorn product.

The cornmeal and water are introduced into the extruder 200 through the feeder 201. After introducing cornmeal and water, the cornmeal and water are mixed and grinded in the barrel/cylinder 202 at the extruder by the twin screws 203 and 204. The twin screws 203 and 204 are rotated by motor 205. The cornmeal paste is obtained in the next stage of the barrel/cylinder 202 in the extruder. The cornmeal paste is subjected to high temperature and pressure conditions. The temperature and pressure are increased so that the cornmeal paste is cooked before the exit from the die holes 207. The cooked cornmeal is extruded out of the die hole 207 in the form of cooked popcorn product. The dimensions of the die hole 207 is smaller than that of the cooked cornmeal. Under the pressure of the twin screws 203 and 204 and high temperature, the new batch of the cooked cornmeal is extruded out of the doe hole 207 with high pressure/force. This pressure/force leads to the formation of plurality of extrusions on the surface of the popcorn product.

Figure 3:
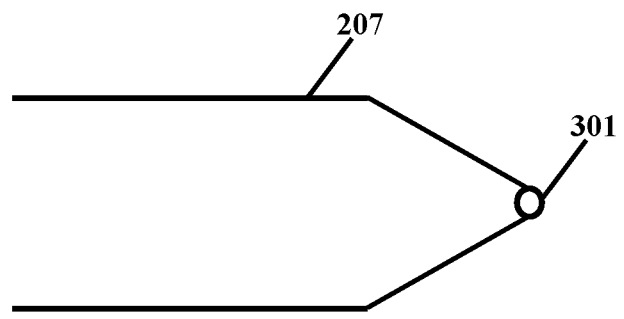
FIG. 3 illustrates a side view of the die holes at the end of the barrel/cylinder in the extruder used for synthesis of puffed popcorn product from cornmeal, according to one embodiment herein.

FIG. 3 illustrates a side view of the die holes at the end of the barrel/cylinder in the extruder used for synthesis of puffed popcorn product from cornmeal, according to one embodiment herein. With respect to FIG. 3, the die holes has a broader section 207 and a narrow section 301. The narrow section 301 of the die hole provides a small space for the cooked cornmeal to exit the extruder. Because of the smaller space 301, the cornmeal exits out of the extruder with pressure and the cornmeal extrudes out with plurality of extrusions. The die holes are designed to have a smaller area than that of the snacks (popcorn product) to simulate the exact condition of explosion of the regular popcorn during synthesis. This allows for the crushed and cooked cornmeal to lose its circular form/shape under high pressure and temperature thereby yielding to many extrusions, which are then turned into regular popcorn-like forms/shapes. Generally the popcorns are produced under high temperature through an explosion when the humidity from the corn kernel escapes out of the corn seeds. According to the embodiment herein, the cornmeal is produced under high pressure and high temperature. The cooked cornmeal forms the same texture, shape and extrusions as that of a regular popcorn when coming out of the machine.

Figure 4:
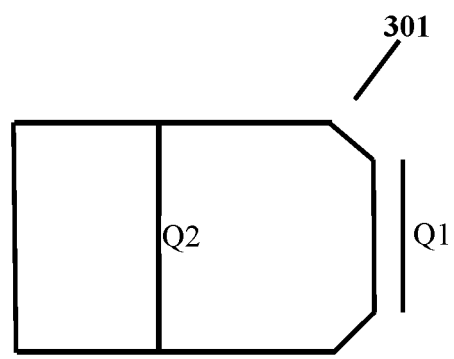
FIG. 4 illustrates an enlarged view of die hole at the end of the barrel/cylinder in the extruder used for synthesis of puffed popcorn product from cornmeal, according to one embodiment herein.

FIG. 4 illustrates an enlarged view of die hole at the end of the barrel/cylinder in the extruder used for synthesis of puffed popcorn product from cornmeal, according to one embodiment herein. The FIG. 4 illustrates the enlarged view of the narrow section of the die hole 301. The difference between the dimensions is Q1 and Q2. The Q1 and Q2 indicate the dimensions of the die hole and the reduction in the dimensions of the die hole. The difference between the dimensions (Q1 and Q2) is 0.3 mm.

Figure 5:
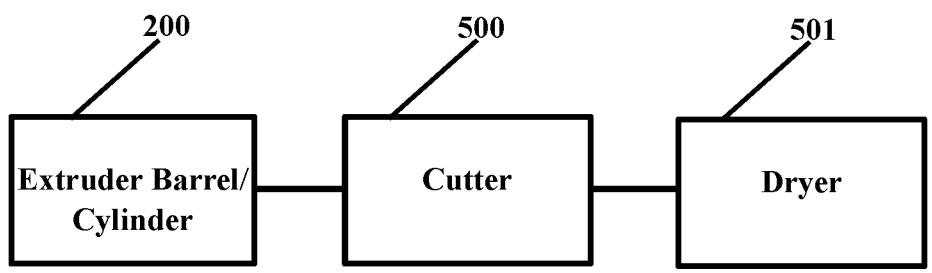
FIG. 5 illustrates a block diagram of a system for manufacturing popcorn product from cornmeal, according to one embodiment herein.

FIG. 5 illustrates a block diagram of a system for manufacturing popcorn product from cornmeal, according to one embodiment herein. With respect to FIG. 5, the barrel/cylinder 200 is the first part where the cornmeal and water are mixed and crushed to form a cornmeal paste. The cornmeal paste is subjected to the pressure of 135 bars and a temperature range of 175-180° C. for cooking. The cooked cornmeal is extruded out of the die holes under pressure. The size of the die holes is smaller than that of the cooked cornmeal. The cornmeal is extruded out of the die holes with plurality of extrusions under high pressure due to smaller size of die holes. the extruded cornmeal has taste and texture similar to that of regular popcorns. After the cooked cornmeal is extruded out of the die holes, the popcorn product is cut into a plurality of pieces of desired length. A cutter machine 500 is installed after the die hole of the barrel/cylinder 200 in the extruder to cut the popcorn product into desired length. After the popcorn product is cut by the cutter 500, the popcorn product is dried with the dryer 501. The popcorn product is cooled prior to packaging. The popcorn product after cutting are subjected to the dryer 501 comprising a conveyer tape. The conveyer tape is moved slowly to cool the popcorn product. The popcorn products become cool. The cooled and dried popcorn products are made crispy. The dryer machine 501 handles the popcorn product very delicately as the popcorn products are highly fragile and porous. The popcorn products which are joined are separated in the end of the dryer by a vibrating separation system or a sieve.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims submitted below. The scope of the invention will be ascertained by the following claims.

What is claimed is:

1. A method of synthesizing puffed and expanded popcorn product from cornmeal, the method comprises the steps of:
   pre-treating corn kernels/corn seeds;
   grinding the pre-treated corn kernels/corn seeds;
   obtaining a cornmeal, and wherein the cornmeal comprises corn particles with a plurality of particle sizes;
   adding the cornmeal into a cylinder/barrel in an extruder through a feeder;
   adding water into the cylinder/barrel in the extruder through the feeder to obtain a cornmeal paste;
   grinding and mixing the cornmeal paste in the cylinder/barrel by a twin screw mechanism in the extruder cylinder/barrel;
   cooking the cornmeal paste under a preset temperature and preset pressure conditions to obtain a cooked cornmeal, and wherein the preset temperature and preset pressure is produced by the twin screw mechanism, and wherein the temperature is controlled and regulated in the cylinder/barrel at the extruder;
   transferring the cooked cornmeal to the end of the extruder with a spiral motion of the twin screw mechanism;
   extruding the cooked cornmeal out of the cylinder/barrel in the extruder under preset pressure through a plurality of die holes to obtain a popcorn product, and wherein the cooked cornmeal is extruded out of the plurality of die holes to achieve an irregular shape, and wherein the cooked cornmeal with irregular shape is cut into a plurality of pieces of desired length after extrusion out of the plurality of die holes to obtain the popcorn product, and wherein the cut cornmeal/popcorn product is cooled and dried on a vibrating separation system or a sieve, and wherein the temperature is controlled in the cylinder/barrel at the extruder by circulating hot water outside the cylinder/barrel in the extruder, and wherein the hot water is circulated outside the cylinder/barrel in the extruder to produce the temperature for cooking the cornmeal in the barrel/cylinder at the extruder, and wherein the cornmeal comprises corn particles of a plurality of sizes, and wherein the corn particles with a particle size of greater than 1000µ are present in a concentration of 5% w/w, and wherein the corn particles with a particle size of 500-1000µ are present in a concentration of 45-50% w/w, and wherein the corn particles with a particle size of 250-500µ are present in a concentration of 25-30% w/w, and wherein the corn particles with a particle size smaller than 250µ are present in a concentration of 25% w/w, and wherein the preset temperature in the cylinder/barrel at the extruder is 180° C., and wherein a temperature at an end portion of the extruder is maintained in a range of 55-60° C., and wherein a temperature of the extruder in an area before die holes is maintained in a range of 40-45° C., and wherein the end portion of the extruder covers an area of 50 cm and wherein the area before die holes covers an area of 25 cm, and the temperature and pressure are increased so that the cornmeal paste is cooked before the exit from the die holes.

2. The method according to claim 1, wherein the step of pre-treating corn kernel or corn seeds comprises removing external shells of corn kernels or corn seeds and removing hard corn kernels or corn seeds.

3. The method according to claim 1, wherein the preset pressure in the cylinder/barrel in the extruder is 135 bars, and wherein the pressure is produced by a circular motion of the twin screw mechanism, and wherein the circular motion of the twin screw mechanism and a pressure produced by the twin screw mechanism pushes the cornmeal forward towards the plurality of die holes.

4. The method according to claim 1, wherein the temperature in the cylinder/barrel at the extruder is controlled to avoid a burning of the cooked cornmeal.

\* \* \* \* \*